(12) United States Patent
Nugent et al.

(10) Patent No.: US 7,422,028 B2
(45) Date of Patent: *Sep. 9, 2008

(54) APPARATUS FOR CONTROLLING AND METERING FLUID FLOW

(75) Inventors: Dale Alan Nugent, Minneapolis, MN (US); John Allan Kielb, Eden Prairie, MN (US); Mark Daniel Litecky, Minneapolis, MN (US)

(73) Assignee: Rivatek, Inc., St. Louis Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/592,488

(22) Filed: Nov. 2, 2006

(65) Prior Publication Data

US 2007/0044843 A1    Mar. 1, 2007

(51) Int. Cl.
*G05D 7/00* (2006.01)

(52) U.S. Cl. ............. 137/487; 137/486; 73/861.53; 73/861.62; 138/45; 138/46; 251/123

(58) Field of Classification Search ............ 137/486, 137/487, 487.5; 138/43, 45, 46; 73/861.52, 73/861.53, 861.58, 861.61, 861.62, 861.64; 251/123

See application file for complete search history.

(56) References Cited

U.S. PATENT DOCUMENTS

| | | | |
|---|---|---|---|
| 1,098,247 A | 5/1914 | Gibbs | |
| 1,580,678 A | 4/1926 | Roučka | |
| 1,946,319 A | 2/1934 | Hodgson et al. | |
| 2,675,020 A | 4/1954 | Breitwieser | |
| 2,863,318 A | 12/1958 | Schroder | |
| 2,918,933 A | 12/1959 | Boitnott | |
| 3,055,389 A * | 9/1962 | Brunner | 137/487 |
| 3,685,786 A | 8/1972 | Woodson | |
| 3,724,503 A | 4/1973 | Cooke | |
| 3,930,518 A | 1/1976 | Fuller et al. | |
| 4,006,634 A * | 2/1977 | Billette et al. | 73/861.53 |
| 4,149,254 A | 4/1979 | Molusis | |
| 4,406,161 A | 9/1983 | Locke et al. | |
| 4,484,479 A | 11/1984 | Eckhardt | |
| 4,651,572 A | 3/1987 | Albertz et al. | |
| 4,742,987 A * | 5/1988 | Kanamori et al. | 251/123 |
| 4,825,747 A | 5/1989 | Bardin et al. | |
| 4,993,269 A | 2/1991 | Guillaume et al. | |
| 5,125,753 A * | 6/1992 | Ries et al. | 374/41 |
| 5,190,068 A | 3/1993 | Philbin | |
| 5,326,468 A | 7/1994 | Cox | |

(Continued)

FOREIGN PATENT DOCUMENTS

DE    37 13 542 A1    10/1987

(Continued)

*Primary Examiner*—Kevin L Lee
(74) *Attorney, Agent, or Firm*—Merchant & Gould P.C.

(57) ABSTRACT

A device for metering and controlling fluid flow includes a variable orifice and is configured to use a pressure sensor. The device includes a fluid flow conduit having at least one planar inner wall that extends along a portion of the fluid flow conduit length, and an element having a linear edge configured to mate with the at least one planar inner wall of the fluid flow conduit. The element is movable in a direction transverse to an axis of the conduit between an open position wherein fluid flows through the conduit and a closed position wherein the element substantially shuts off fluid flow in the conduit.

18 Claims, 5 Drawing Sheets

U.S. PATENT DOCUMENTS

| | | | |
|---|---|---|---|
| 5,331,995 A | 7/1994 | Westfall et al. | |
| 5,487,405 A | 1/1996 | Skoglund | |
| 5,576,498 A | 11/1996 | Shambayati | |
| 5,622,204 A | 4/1997 | Skoglund | |
| 5,672,832 A | 9/1997 | Cucci et al. | |
| 5,693,887 A | 12/1997 | Englund et al. | |
| 5,782,260 A | 7/1998 | Jacobs et al. | |
| 5,869,766 A | 2/1999 | Cucci et al. | |
| 6,152,168 A | 11/2000 | Ohmi et al. | |
| 6,192,925 B1 * | 2/2001 | Shen | 137/505.38 |
| 6,339,963 B1 | 1/2002 | Torkildsen | |
| 6,422,256 B1 | 7/2002 | Balazy et al. | |
| 6,463,810 B1 | 10/2002 | Liu | |
| 6,539,315 B1 | 3/2003 | Adams et al. | |
| 6,561,207 B2 | 5/2003 | Lowery et al. | |
| 6,564,824 B2 | 5/2003 | Lowery et al. | |
| 6,578,435 B2 | 6/2003 | Gould et al. | |
| 7,131,451 B2 | 11/2006 | Nugent et al. | |

FOREIGN PATENT DOCUMENTS

| | | |
|---|---|---|
| EP | 0 565 485 A1 | 10/1993 |
| EP | 0 767 895 B1 | 1/1999 |
| JP | 8-136306 | 5/1996 |
| JP | 11117915 | 4/1999 |

* cited by examiner

APPARATUS FOR CONTROLLING AND METERING FLUID FLOW

CROSS REFERENCE TO RELATED APPLICATIONS

This application claims priority to U.S. Pat. No. 7,131,451 issued on Nov. 7, 2006, which claims priority to U.S. Provisional Application Ser. No. 60/500,774, filed on Sep. 4, 2003, entitled APPARATUS FOR CONTROLLING AND METERING FLUID FLOW, the disclosure of which is incorporated by reference herein in its entirety.

BACKGROUND OF THE INVENTION

1. Technical Field

The present invention generally relates to fluid flow, and more particularly to a variable orifice for metering and controlling fluid flow.

2. Related Art

In process control industries, it is common to use small diameter tubes to carry process fluids at low flow rates when small amounts of fluids are required for manufacturing processes. The tubes are almost always of a circular cross-section. Instruments used to measure a flow rate in the tubes must interface with a fluid flowing in the tube while minimizing disturbance to the fluid flow. To minimize disturbance to the fluid flow, the instrument typically includes a circular cross-section to match the cross-section of the tubes. The flow rate for a flow meter measuring a change in pressure across an orifice is defined by the following equation:

$$Q = C * A_o * \left( \frac{1}{1 - \left(\frac{A_o}{A_p}\right)^2} \right)^{\frac{1}{2}} * \left( 2 * \frac{(P_{hi} - P_{lo})}{\rho} \right)^{\frac{1}{2}}$$

Where:
Q=volumetric flow rate
C=orifice discharge coefficient
$A_o$=cross-sectional area of the orifice
$A_p$=cross-sectional area of the pipe
$P_{hi}$=upstream pressure
$P_{lo}$=downstream pressure
$\rho$=density of the fluid Flow meters used for measuring flow rates in small tubes may have the pressure sensors and orifice integrated in the same housing. Since the flow rate is a function of the cross-sectional area of the orifice, it is important to know with precision the size of the orifice opening. Typically, orifice based flow meters include an orifice having a fixed opening and the user is required to change the entire flow meter in order to obtain a different orifice size to accommodate different flow rates. Attempts have been made to produce flow meters with variable orifices. However, if the orifice opening does not retain a consistent shape as the size of the orifice opening is changed, errors result when calculating the flow rate using the above flow equation. For example, if a circular orifice compresses into a slightly elliptical shape rather than a perfect circular shape, an error may result when calculating the flow rate because the area value for the equation assumes the shape will remain circular. Also, the shape of the front edge and the rear edge of the orifice directly affect the discharge coefficient of the orifice and subsequent flow characteristics of the orifice. If the shape of the front edge or rear edge of the orifice changes with the size of the opening, flow characteristics of the orifice will change continuously. If the discharge coefficient is not consistent as the size of the orifice opening changes, and if it is not known with precision, errors will again result using the above flow equation.

Metering and controlling fluid flow is most commonly performed using separate devices or at least separate features included in a single device. For example, a device that meters fluid flow using an orifice may include a separate valve member that controls the amount and pressure of fluid flowing through the flow tubes, and therefore the orifice. In other applications, a separate valve device is positioned in the flow path before or after the metering device. In either scenario, the separate nature of the metering and controlling functions results in a bulky and often expensive arrangement for performing both metering and control of the fluid flow. Also, because the separate features must be connected together, additional seals or gaskets are required to prevent leaks.

Known variable orifice devices are ineffective for several reasons. First, known variable orifice devices typically use circular or curved members that are moved with respect to the fluid flow to change the size of the orifice. Because of the curved nature of these members, the shape of the orifice changes as the size of the orifice changes, which results in significant errors when calculating the fluid flow over a range of orifice sizes. Second, the changed shape of the orifice leads to non-ideal orifice shapes for at least a portion of the flow range. This leads to inconsistent flow characteristics for any given opening as flow rate changes, again leading to errors in the calculation of fluid flow.

A flow device that addresses these and other shortcomings of known flow control and metering devices would be an important advance in the art.

SUMMARY OF THE INVENTION

The present invention relates to a device for metering and controlling fluid flow that includes a variable orifice and a pressure sensor. In one aspect of the invention, the device includes a fluid flow conduit having at least one planar inner wall that extends, and an element having a linear edge configured to mate with the at least one planar inner wall of the fluid flow conduit. The element is movable in a direction transverse to an axis of the conduit between an open position wherein fluid flows through the conduit, and a closed position wherein the element substantially shuts off fluid flow in the conduit.

Another aspect of the invention relates to a device for controlling fluid flow or for metering fluid flow, of the type having a variable orifice and configured to use a pressure or differential pressure signal. The device includes a conduit having first, second and third segments, wherein the first and third segments have a circular cross-section and the second segment includes a non-circular cross-section having at least two planar portions and is positioned between the first and third segments. The device also includes an element having at least one linear edge configured to engage the second segment to substantially shut off fluid flow in the conduit.

A further aspect of the invention relates to a device for measuring and controlling fluid flow that includes a conduit having an input portion with an inner circular cross-section, and an orifice portion with an inner rectangular cross-section, a pressure sensor configured to measure pressure within the conduit, and a movable element adapted and configured to engage the inner rectangular cross-section of the orifice portion to control fluid flow.

Another aspect of the invention relates to an apparatus for controlling and metering fluid flow that includes a housing, a movable element, and first and second pressure sensors. The housing includes a fluid flow conduit having first, second and third portions along a length of the conduit, the second portion including at least one planar sidewall, and also includes an element bore providing access to the conduit. The housing further includes first and second sensor chambers that are in fluid communication with respective first and second portions and second and third portions of the conduit. The element includes a linear edge configured to mate with the at least one flat sidewall of the conduit second portion to form a seal therewith and is movable in the element bore between an open position wherein fluid flows through the conduit and a closed position wherein the element seats against the planar sidewall and substantially shuts off fluid flow in the conduit. The first and second pressure sensors are mounted in respective first and second sensor chambers and are configured to determine a pressure differential across the conduit.

Another aspect of the invention relates to a method of controlling fluid flow through a device that includes at least one pressure sensor, a conduit having a first portion with a circular inner cross-section and a second portion with a rectangular inner cross-section, and a movable element having at least one linear edge. The method includes moving the movable element into the conduit in a direction transverse to a longitudinal direction along a length of the conduit, and engaging the linear edge of the movable element with the at least one flat sidewall of the conduit when in the closed position to form a seal by seating with the at least one flat sidewall.

A further aspect of the invention relates to a method of metering and controlling fluid flow through a fluid flow apparatus that includes a housing, a movable element, and first and second pressure sensors. The method includes forming a conduit through the housing that includes at least first, second and third portions. The first and third portions include a circular inner cross-section and the second portion includes at least one planar sidewall. The method also includes forming first and second sensor chamber in the housing so as to be in fluid communication with respective first and second portions of the conduit and second and third portions of the conduit. The method further includes forming a element bore in the housing that extending transverse to the conduit and provides access to the second portion of the conduit, moving the movable element in the element bore to control fluid flow in the conduit, and engaging the linear edge of the movable element with the at least one flat sidewall of the conduit when in the closed position to form a seal with the at least one planar sidewall. The method also includes determining a pressure differential between the first and second sensor chambers using a pressure signal provided by each of the first and second pressure sensors, and metering the fluid flow based on the pressure differential. Alternatively, a single differential pressure sensor may be used in place of separate sensors. Another aspect of the method may include using a pressure signal from an outside source for controlling and metering fluid flow in the device in place of or in addition to pressure signals from the pressure sensor(s) associated with the device.

These and further objects of the present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE PREFERRED EMBODIMENT

The invention generally relates to metering and controlling fluid flow, and more particularly to a variable orifice for metering and controlling fluid flow. The variable orifice may be part of a flow device that translates an incoming flow having a circular cross-sectional flow area to a metered flow having a non-circular cross-sectional flow area that includes at least one linear, flat side. One example cross-sectional shape for the metered flow is a rectangle having four linear, flat sides. Other cross-sectional shapes for the metered flow may include, for example, a parallelogram, a rhombus, or other polygon shape, but may also include shapes that have a combination of flat and curved surfaces. The variable orifice may be particularly suited for use in a differential pressure flow meter as will be described herein with reference to the several drawings, although such an application is only exemplary of the many applications to which principles of the present invention may be applied.

One example flow device 10 for controlling and metering fluid flow is shown in FIGS. 1-8. The device includes a housing 12, a moveable element 14, first and second pressure sensors 16, 18, and inlet and outlet conduit connectors 22, 20. A conduit 30 is formed through the housing and includes first, second and third segments 50, 52, 54. The housing also includes first and second sensor bores 36, 38 that intersect with the conduit 30 in a direction transverse to the conduit 30, and an element bore 40 that also intersects with conduit 30 in a direction transverse to conduit 30. In this example, element bore 40 and sensor bores 36, 38 extend parallel to each other, but may be aligned perpendicular to each other in other embodiments, such as flow device 100 shown in FIGS. 9 and 10. Housing 12 may also be divided into separate pieces or halves 13, 15 (see FIG. 1) to facilitate precise formation of intricate features within the housing.

Moveable element 14 includes a base 42 and a contact member 44, and is positioned in element bore 40 so as to extend into second segment 52 of the conduit 30. Contact member 44 includes a leading edge 46, a tapered trailing edge 48, and a planar contact surface 49 (see FIG. 5) configured to mate with a planar surface (for example, fixed wall 90 described below and shown in FIG. 5) of second segment 52.

The movable element 14 is moveably adjustable along a linear axis through a range of positions between an open (retracted) position and a closed position, with movement of the movable element 14 being limited to the linear axis. The open position allows a maximum fluid flow through the conduit 30. The fluid flow through the conduit 30 decreases as the movable element 14 is moved toward the closed position due to contact with the fluid. Adjustment of the movable element 14 in element bore 40 may be performed using, for example, a linear actuator, a stepper motor, a hydraulic or pneumatic actuator, a solenoid, a servo motor, or a manual device such as a threaded shaft with a thumb turn button. The position of the movable element 14 may be determined using, for example, a Hall effect sensor, magnetostrictive devices, linear variable differential transformers (LVDTs), optical encoder, and other position determining technologies. Limiting movement of element 14 to linear motion within element bore 40 may simplify positioning of movable element 14.

Second segment 52 includes an inlet portion 60, an outlet portion 62, and an orifice portion 64 positioned between the inlet and outlet portions 60, 62. The inlet portion 60 is in fluid communication with sensor chamber 32 at one end, and includes a plurality of tapered surfaces at a second end adjacent to the orifice portion 64. Similarly, outlet portion 62 is in fluid communication with sensor chamber 34 at one end, and includes a plurality of tapered surfaces at an opposing end adjacent to orifice portion 64.

The inlet and outlet portions of the orifice segment of the device preferably include a plurality of fixed sidewalls that define a noncircular cross-section. The example first and third portions 60, 62 include four fixed walls substantially in the shape of a square (see example cross-section of inlet portion 60 in FIG. 7). As used throughout this document, rectangular is defined as a four-walled shape and a square is defined as a rectangle that has four walls of the same length. The walls of a rectangle are substantially flat or linear and the intersection of two walls provides an angle of about 90°. In some applications, the corners of the rectangle may be tapered slightly with a round, fillet, chamfer or like feature as a result of manufacturing limitations. Further, a portion of one or more of the walls may be slanted or chamfered slightly to create sealing points or to meet other design goals and/or address manufacturing limitations. In embodiments that include a combination of linear and curved walls (not shown), the intersection of these walls may also include features such as rounds, fillets, chamfers, etc. Finally, a portion of one or more of the walls may be formed by the exposed face of a gasket or seal.

Tapers 70, 72, 74, 76 are formed in the sidewalls of inlet portion 60 to reduce the cross-sectional area at the point where inlet portion 60 abuts to orifice portion 64. The tapers 70, 72, 74, 76 are aligned at a single axial position so as to create a reduction in cross-sectional area of portion 60 in a single step (see FIG. 3-5). Outlet portion 62 also includes a square shaped cross-section with tapered surfaces 78, 80 (see FIG. 4) on opposing sidewalls so as to reduce the cross-sectional area of outlet portion 62 at the transition point between orifice portion 64 and outlet portion 62.

Figure 1:
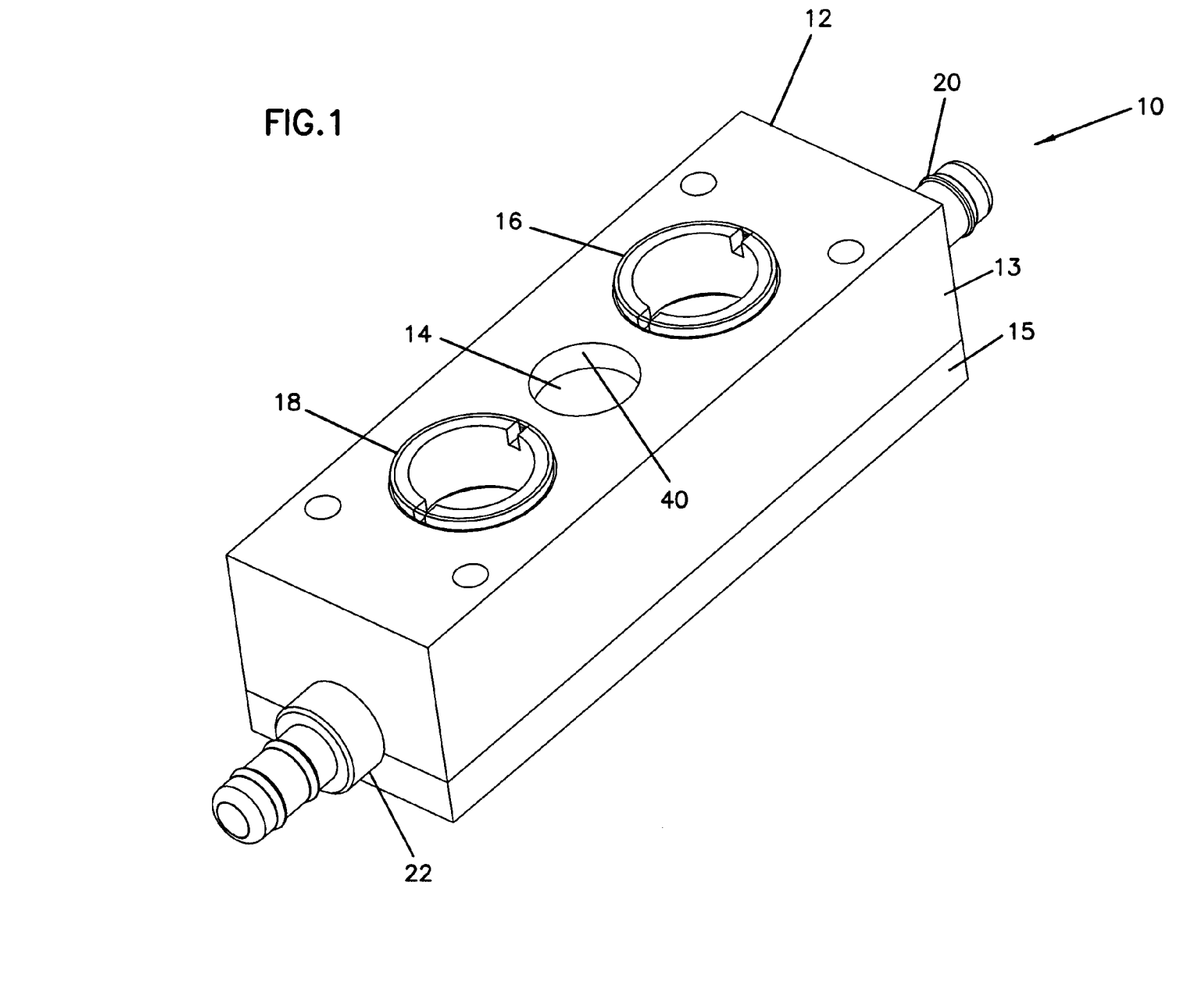
FIG. 1 is a top perspective view of an flow device according to principles of the invention.
Figure 2:
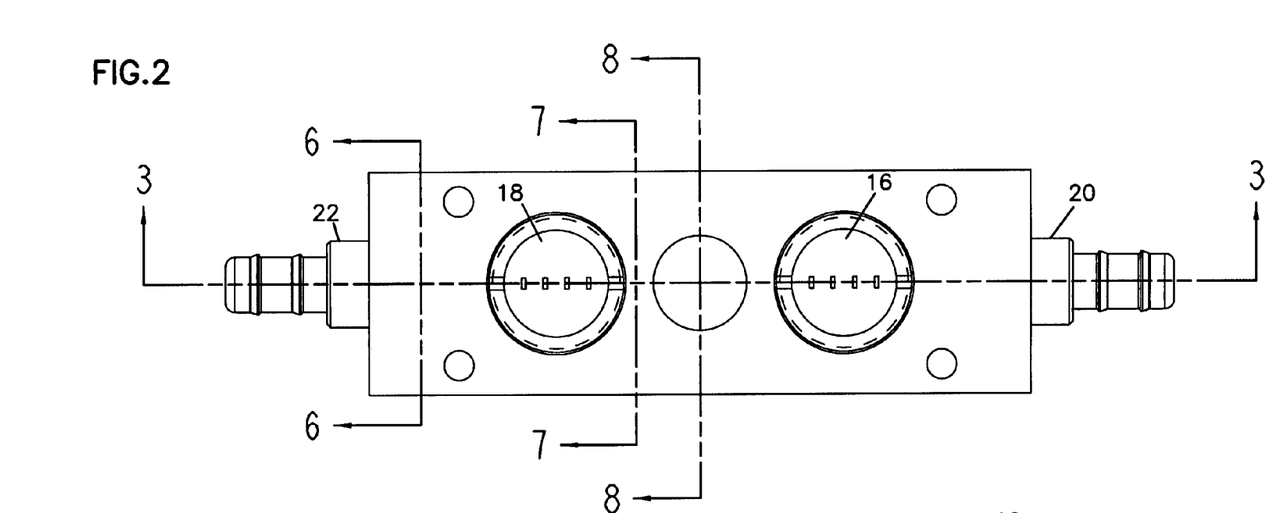
FIG. 2 is a top plan view of the flow device shown in FIG. 1.
Figure 3:
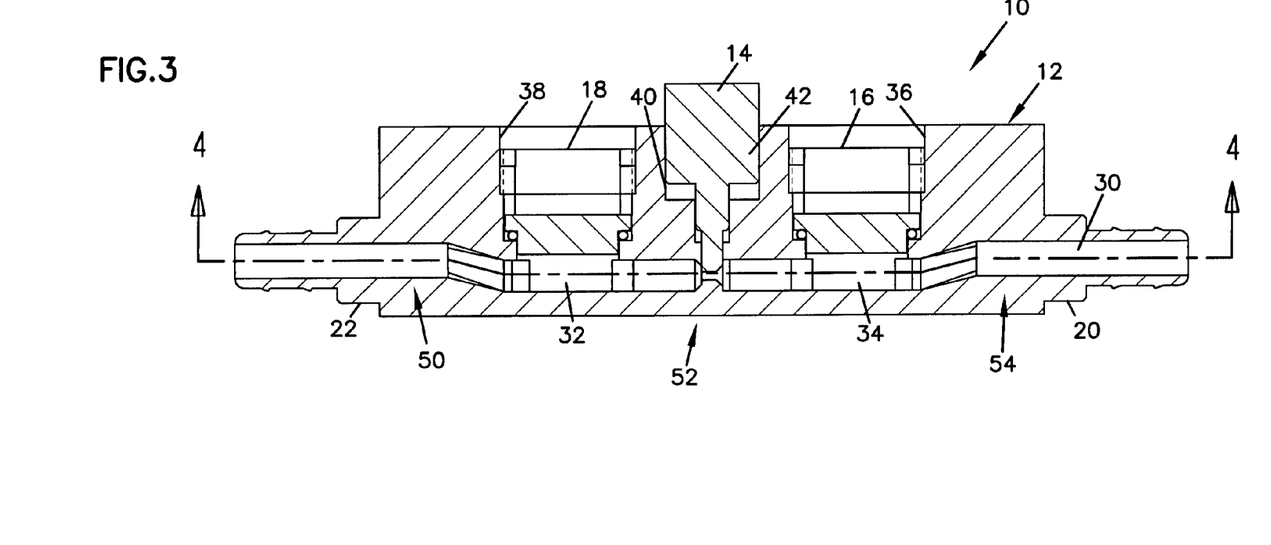
FIG. 3 is a cross-sectional view of one example configuration of the flow device shown in FIG. 2 taken along cross-sectional indicators 3-3.
Figure 4:
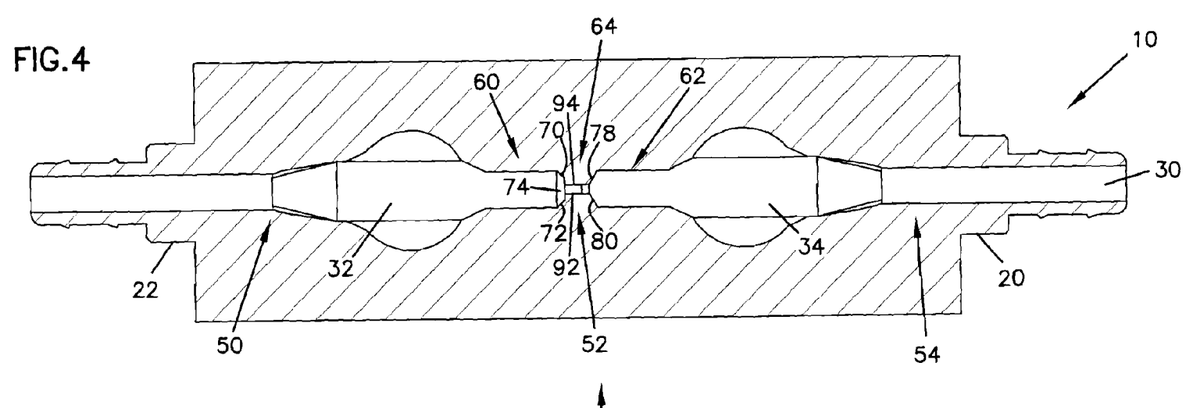
FIG. 4 is a cross-sectional view of the example flow device shown in FIG. 3 taken along cross-sectional indicators 4-4.
Figure 5:
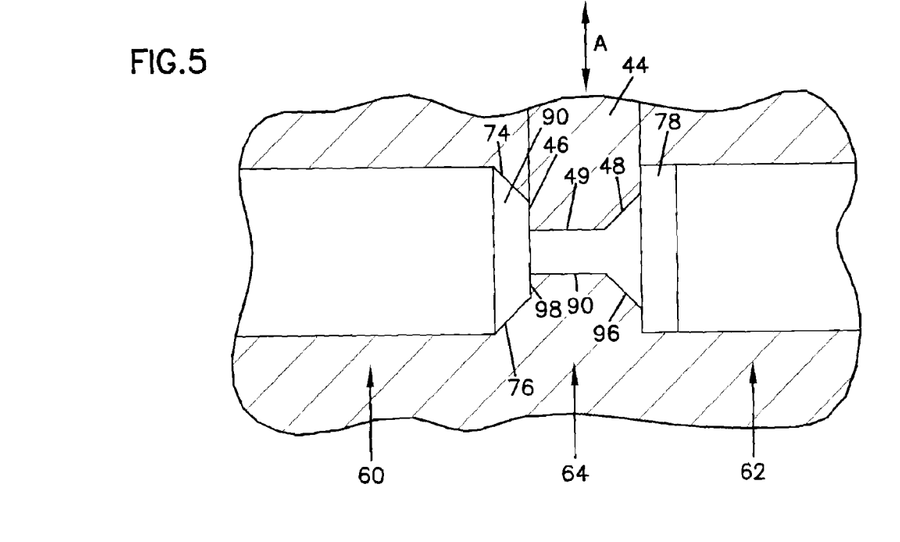
FIG. 5 is an enlarged view of the orifice and movable element portion of the device shown in FIG. 4.
Figure 6:
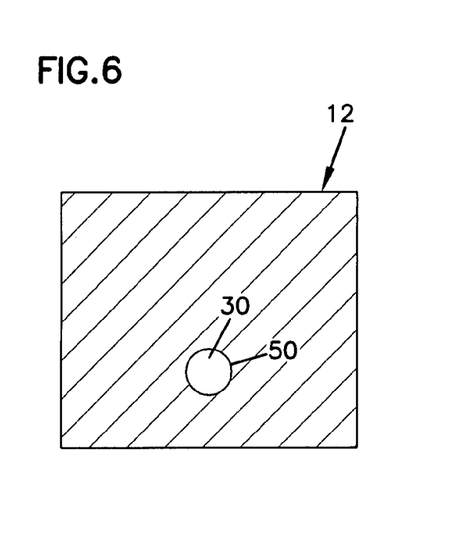
FIG. 6 is a cross-sectional view of the example flow device shown in FIG. 2 taken along cross-sectional indicators 6-6.
Figure 7:
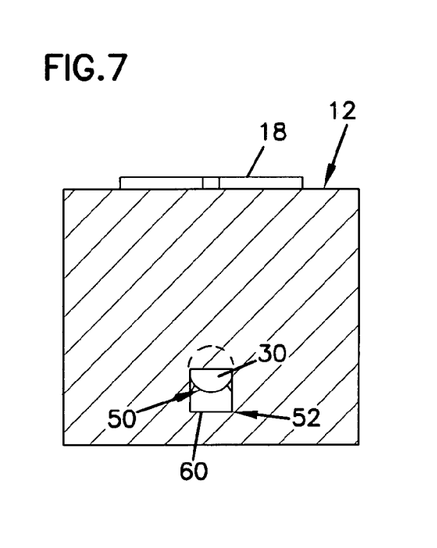
FIG. 7 is a cross-sectional view of the example flow device shown in FIG. 2 taken along cross-sectional indicators 7-7.
Figure 8:
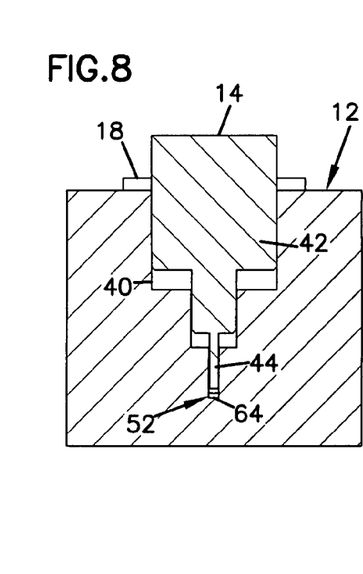
FIG. 8 is a cross-sectional view of the example flow device shown in FIG. 2 taken along cross-sectional indicators 8-8.

Orifice portion 64 includes three fixed walls 90, 92, 94 with fixed wall 90 including a tapered trailing edge 96 and a leading edge 98 (see FIG. 5). As a result, the cross-sectional area of orifice portion 64 tapers out to the larger cross-sectional area of portion 62 in two steps with sets of tapers 96, 48 and 78, 80. As shown in the cross-sectional view of FIG. 8, orifice portion 64 has a relatively small cross-sectional area as compared to the cross-sectional area of inlet portion 60 shown in FIG. 7.

The leading edges 46, 98 and trailing edges 96, 48 of respective moving element 44 in orifice portion 64 provide consistent flow characteristics into and out of the orifice portion 64. A cross-sectional size of the orifice portion 64 is determined by the location of the movable element 14 in relation to the fixed walls 90, 92, 94 of the orifice portion 64. The orifice portion 64 is void of sensor openings and dead volume spaces to avoid disruptions to the fluid flow and potential accumulation of process material or sediment.

A linear actuator (not shown) such as those discussed above (e.g., stepper motor, servo motor, etc.) may be used to affect movement of the movable element 14. By moving along a single linear axis, the movable element 14 linearly changes the cross-sectional size of the orifice portion 64 while maintaining a generally uniform shape to provide a relatively consistent set of flow characteristics through the range of movable element positions. The cross-sectional shape of orifice portion 64 allows repeatable regulation of the fluid flow in accordance with the position in the range of positions of the movable element 14. In one example wherein the uniform shape is a rectangle, the height of the cross-sectional area of the orifice portion 64 is reduced in size as the movable element 14 moves between the open and closed positions. Maintaining a rectangular shape, or at least a shape having at least one planar or linear sidewall, minimizes variations in flow characteristics (variable "C" in the flow rate equation in the Background section), thus reducing errors when determining the flow rate for each orifice size.

Figure 9:
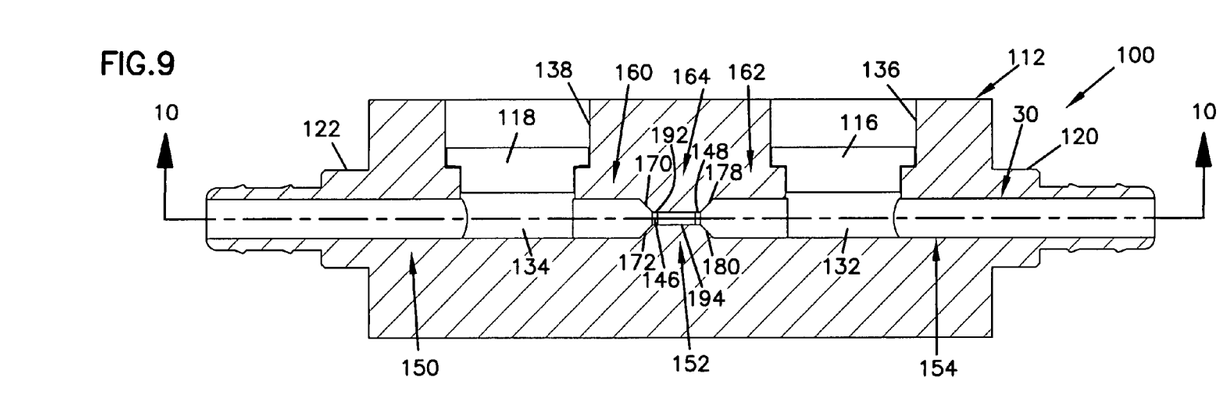
FIG. 9 is a cross-sectional view of another example configuration of the flow device taken along a length of the flow device.
Figure 10:
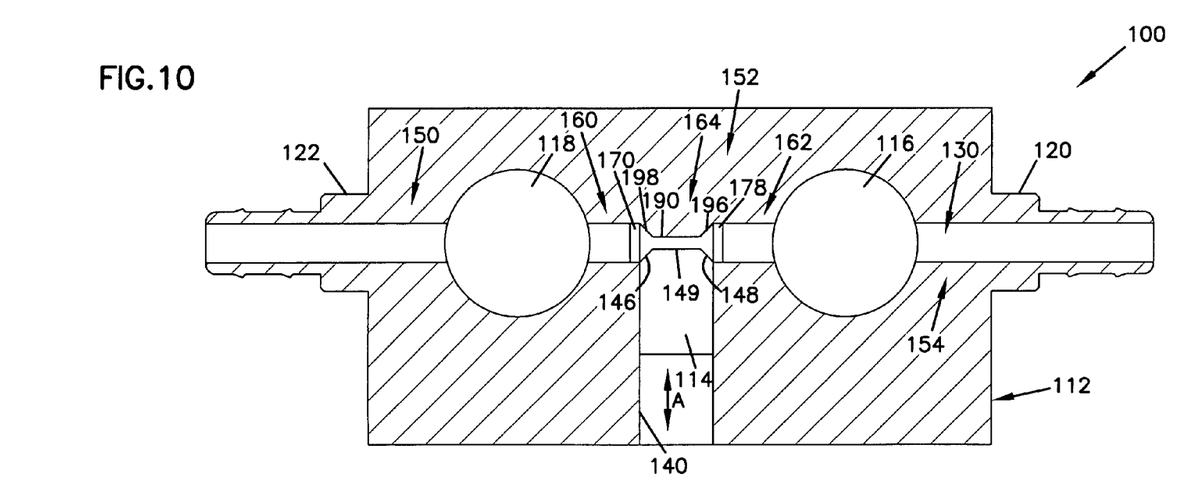
FIG. 10 is a cross-sectional view of the example flow device shown in FIG. 9 taken along cross-sectional indicators 10-10.

In another example flow device 100 shown in FIGS. 9 and 10, the flow device includes a housing 112, a moveable element 114, first and second pressure sensors 116, 118, inlet and outlet conduit connectors 120, 122, and a conduit 130 formed in the housing. The housing also includes first and second sensor chambers 132, 134, sensor bores 136, 138 that house first and second pressure sensors 116, 118, and an element bore 140 that houses moveable element 114. The conduit includes first, second and third segments 150, 152, 154, wherein the first and third segments 150, 154 include a circular cross-section and the second segment 152 includes a noncircular cross-section.

The second segment 152 includes an inlet portion 160, an outlet portion 162, and an orifice portion 164. Orifice portion 164 includes first, second and third fixed walls 190, 192, 194, a tapered trailing edge 196, and a tapered leading edge 198.

The inlet and outlet portions 160, 162 each include two sets of opposed sidewalls that are tapered at separate axial positions adjacent to orifice portion 164. Inlet portion 160 includes tapered surfaces 170, 172 at a first axial position. The cross-sectional area of second segment 152 is further reduced at the inlet side of orifice portion 164 with tapered leading edge 198 and tapered leading edge 146 of movable element 114. The cross-sectional area of second segment 152 is expanded out at the outlet side of orifice portion 164 with tapered trailing edge 196 and tapered trailing edge 148 of movable element 114. Outlet portion 162 includes tapered surfaces 178, 180 on a first set of opposed sidewalls to further expand out the cross-sectional area of segment 152 after the orifice portion 164. Thus, flow device 100 differs from flow device 10 in that the tapered surfaces of the inlet portion 160 is spaced apart axially along conduit 130 rather than a simultaneous taper of all four sidewalls at the inlet side of the orifice portion as shown with reference to flow device 10 in FIG. 3-5.

Another difference between flow devices 110 and 1100 is the entrance into orifice portions 64, 164. In flow device 10, the tapers 70, 72, 74, 76 do not directly taper the fluid into the orifice portion 64. As best seen in FIG. 5, the leading edge 46 of moveable element 14 and the leading edge 98 of orifice portion 64 provide a generally flat wall-like surface that creates a high pressure area at the inlet of the orifice portion 64. Depending on the position of moveable element 14 along the direction A, the pressure at the inlet to orifice portion 64 may change somewhat, which is to be expected when increasing or decreasing the size of the orifice portion 64. The pressure at the inlet to orifice portion 64 may also be affected by the size of the wall-like structure defined by the leading edges 46, 98.

In contrast, the entrance to orifice portion 164 and flow device 100 more directly tapers the inlet portion 60 into the orifice portion 64 due to the tapered leading edge 148 of moving element 114 and the more significant tapers 170, 172.

In use, fluid first enters flow device 10 (which example will be used for the remainder of the description of various aspects of the invention) through first segment 50 of conduit 30. The flow through segment 50 has flow characteristics that match the circular cross-section of first segment 50. The flow then enters the open sensor chamber 32 where a transition volume is provided prior to the fluid flow entering the non-circular inlet portion 60 of second segment 52. The flow is then reduced in cross-sectional area by the several tapers formed in inlet portion 60 just before orifice portion 64. As mentioned above, a higher pressure is generated at the inlet to orifice portion 64 due to the very small cross-sectional area of orifice portion 64 and the wall-like structure created by leading edges 46, 98. The cross-sectional area of orifice portion 64 is dependent on the position of moveable element 14 in the direction A. Each position along the direction A corresponds to a different cross-sectional area of the orifice portion 64 for use in determining the volumetric flow through the flow device 10.

As the fluid exits orifice portion 64, the cross-sectional area of the fluid flow increases due to tapers 78 and 80 and trailing edges 48 and 96 of the moveable element 14 and orifice portion 64 as the flow enters portion 62. The cross-sectional area of outlet portion 62 preferably has the same size and shape as the cross-section of inlet portion 60 (which is a square cross-section in the example flow device in flow device 10—see FIG. 10). Flow exiting outlet portion 62 enters sensor chamber 34 where another transition volume is provided before the fluid flow enters the third segment 54 and takes on a flow pattern for the circular cross-section of third segment 54.

The first and second pressure sensors 16, 18 are positioned at opposing sides of orifice portion 64 so as to be able to determine a difference in pressure at the inlet and outlet sides of second segment 52 of conduit 30. The first and second pressure sensors 16, 18 may be mounted proximate the process liquid to minimize the amount of dead volume of the fluid and reduce crystallization and particle buildup between the first and second pressure sensors 16, 18 and the fluid in conduit 30. In other aspects of the present invention, a single differential pressure sensor may be used to communicate with both the first and second sensor chambers 32, 34 to determine the pressure difference. Furthermore, only a single pressure sensor may be required in applications where one of the first or second sensor chamber 32, 34 has a fixed pressure. For example, if the second sensor chamber 34 is downstream of the orifice and empties into an open tank at atmospheric pressure, a downstream pressure measurement is not required and the pressure measurement from the first sensor 16 may be used singly with atmospheric pressure to determine the pressure differential. Likewise, if the first sensor chamber 32 is upstream of the orifice portion 64 and is accepting liquid from a pressurized tank where pressure is tightly controlled to a fixed value, an upstream pressure is not required and the pressure measurement from the second sensor 18 may be used singly with the fixed upstream pressure value to determine the pressure differential.

Other example embodiments may use a single differential pressure sensor that takes pressure readings from the inlet and outlet sides of the orifice portion of the device and determines a differential pressure across the orifice portion. This and other types of sensors do not necessarily have to be mounted in a sensor bore, nor does the sensor bore being used require a larger cross-sectional area than the cross-sectional area of the conduit. For example, a sensor may be configured to obtain pressure readings using a small probe that requires a very small entrance opening into the conduit relative to the conduit size, and the sensor can be mounted at a different location within or adjacent to the device housing.

Yet further embodiments may not include any sensors associated directly with the device, but may be configured to use pressure signals provided by outside sources. Such pressure readings from an outside source may include, for example, a pressure reading from a pressure sensor positioned up or down stream from the device, or a pressure signal representative of a know static pressure condition for the system either up or down stream of the device. Thus, although the device does not require a pressure sensor, the device is preferable configured to use a pressure signal for purposes of metering and controlling fluid flowing through the device.

A pressure signal representing a pressure differential across an orifice may be used with the cross-sectional area of the orifice, the cross-sectional area of the inlet and outlet portions just before and after the orifice, and the density of the fluid to determine the volumetric flow rate (discussed in the Background section above).

The sensor chambers discussed herein may have a size and volume that is dependent on the size of the sensor housed in the sensor bore. A large sensor bore (such as bore 36 shown in FIG. 3) may advantageously provide a large sensor chamber that effectively transitions flow and pressure between the circular and non-circular segments of the device conduit. In other embodiments that do not include a sensor chamber or include a sensor chamber that is very small relative to the size of the conduit, the device may include other transition features suited for use in those configurations.

Various materials may be well suited for use with a flow device according to principles of the present invention. In one example, the movable element is formed from a rigid material such as, for example, metal, metal alloys such as stainless steel, polymer materials such as Teflon and other rigid plastics, ceramics, or industrial gemstones. Likewise, the housing and other features of the example flow devices may be made of similar metallic, polymer, ceramic or other types of corrosive or non-corrosive materials.

Flow device 10 is symmetrical about the conduit 30 and along a length of the housing 12. As will be recognized by those skilled in the art, a flow device according to principles of the present invention may be nonsymmetrical in various respects without departing from the spirit or scope of the present invention.

Flow device 10 includes several features in combination believed to produce synergistic results. Such features may be utilized singly and in other combinations with other features according to the teachings of the present invention. For example, according to the teachings of the present invention, the movable element 14 may be used to control fluid flow without metering the flow. Likewise, the orifice portion 64 may be used without the movable element 14 and in combination with other features of the device, such as the first and second sensor chambers 30, 32 and the first and second pressure sensors 16, 18 to provide metering of the fluid flow without controlling the flow. Such a feature may be useful if a fixed pressure signal (ΔP) is desired and the device may then be used for metering only.

Another advantage of the present invention is that the pressure signal (ΔP) may be optimized at each flow rate by varying the orifice size. For example, the pressure signal may be set at a minimum value for a given flow rate by varying the orifice size. Furthermore, the pressure signal may be optimized for every desired flow rate and inlet pressure available by varying the orifice size.

Furthermore, although the cross-sections of the inlet, outlet and orifice portions 60, 62, 64 of second segment 52 are shown having a rectangular shape, it may be appreciated that the cross-sections may be cross-sections of different shapes, such as, but not limited to, rectangles, isosceles triangles or the like. Furthermore, different portions of the second segment 52 may have dissimilar cross-sectional shapes and sizes, and may have varying shapes or sizes along a length of each portion of the second segment 52. Additionally, although the orifice portion 64 has a rectangular cross-sectional, the leading and trailing portions of the orifice portion 64 defined by the leading and trailing edges 44, 46 of the movable element 14 and the leading and trailing edges 98, 96 of the fixed walls 90, 92, 94 may be of different sizes, shapes and orientations than those shown in the figures.

The above specification, examples and data provide a complete description of the manufacture and use of the composition of the invention. Since many embodiments of the invention may be made without departing from the spirit and scope of the invention, the invention resides in the claims hereinafter appended.

We claim:

1. A device for controlling fluid flow, of the type having a variable orifice and configured to use a pressure signal, comprising:
    a fluid flow conduit having a cross-sectional area and at least one planar inner wall extending in a longitudinal direction of the conduit; and
    an element having a planar surface, the planar surface oriented facing the at least one planar inner wall, a spacing between the planar surface and the at least one planar inner wall defining the variable orifice, the element being movable relative to the fluid flow conduit in a direction transverse to the longitudinal direction to vary a cross-sectional area of the variable orifice, a maximum cross sectional area of the variable orifice being smaller than the cross-sectional area of the fluid flow conduit.

2. The variable orifice of claim 1, wherein the conduit comprises a portion having a rectangular cross-section and the element comprises a substantially rectangular shaped cross-section.

3. The variable orifice of claim 1, wherein the pressure signal is provided by a pressure sensor mounted in the housing.

4. The variable orifice of claim 1, wherein the pressure signal is provided by a pressure device at least partially mounted outside the housing.

5. A device for measuring fluid flow, of the type having a variable orifice and configured to use a pressure signal, comprising:
    a fluid flow conduit a planar portion extending in a longitudinal direction of the conduit; and
    an element having a planar surface, the planar surface oriented facing the planar portion, a spacing between the planar surface and the planar portion defining the variable orifice, the element being movable in a first direction that is transverse to the longitudinal direction to vary a cross-sectional size of the variable orifice, the element having a width measured in second direction that is transverse to the first direction and the longitudinal direction;
    wherein the fluid flow conduit has a width dimension measured in the second direction, and the minimum width of the fluid flow conduit is greater than a maximum width of the element.

6. The variable orifice of claim 5, wherein the conduit comprises a portion having a rectangular cross-section and the element comprises a substantially rectangular shaped cross-section.

7. The variable orifice of claim 5, wherein the pressure signal is provided by a pressure sensor mounted in the housing.

8. The variable orifice of claim 5, wherein the pressure signal is provided by a pressure device at least partially mounted outside the housing.

9. An apparatus for controlling and metering fluid flow, comprising:
    a housing including:
        a fluid flow conduit having first, second and third portions along a length of the conduit, the first and third portions each having a cross-section and the second portion including a cross-section and at least one planar sidewall, the cross-section of the second portion being smaller than the cross-sections of the first and second portions, the second portion being positioned between the first and third portions;
        an element bore extending transverse to the conduit and providing access to the second portion; and
        at least one pressure sensor chamber;
    an element having a planar surface, the planar surface oriented facing the planar sidewall, the element movable in the element bore to alter a relative spacing between the planar sidewall and the planar surface, the spacing between the planar surface and the planar sidewall defining a variable orifice; and
    at least one pressure sensor mounted in the at least one pressure sensor chamber and configured to determine a pressure condition in the housing.

10. The apparatus of claim 9, wherein the first and third portions of the conduit include a circular cross-section, and the second portion of the conduit includes a rectangular cross-section.

11. The apparatus of claim 9, wherein the second portion of the conduit includes a flow control section, the flow control section having at least two different cross-sections.

12. The apparatus of claim 11, wherein the flow control section includes an inlet and an outlet that each include at least one tapered surface that transitions from the first and third portions to the second portion.

13. The apparatus of claim 9, wherein the planar surface includes a leading edge facing in an upstream direction in the conduit and a trailing edge facing in a downstream direction in the conduit.

14. The apparatus of claim 9, wherein the housing includes first and second pressure sensor chambers and first and second pressure sensors.

15. A fluid flow controlling device, comprising:
    a conduit having a first portion, a second portion, and an orifice portion, the orifice portion positioned at a location along the conduit between the first and second portions, a maximum cross-sectional area of the orifice portion being smaller than a maximum cross-sectional area of the first portion and the second portion;

a pressure sensor arrangement configured to measure pressure within the conduit; and a movable element extending into the conduit and movable relative to the orifice portion of the conduit in a direction transverse to a longitudinal dimension of the conduit to control fluid flow through the conduit;

wherein the first and second portions of the conduit include a circular cross-section and the orifice portion of the conduit includes a rectangular cross-section.

16. The fluid flow controlling device of claim 15, wherein the orifice portion includes a planar portion and the movable element includes a planar surface, the planar surface oriented facing the planar portion, a variable orifice defined between the planar surface and the planar portion.

17. The fluid flow controlling device of claim 15, wherein the pressure sensor arrangement includes first and second pressure sensors, the first pressure sensor configured to measure a pressure condition in the first portion of the conduit and the second pressure sensor configured to measure a pressure condition in the second portion of the conduit.

18. A fluid flow controlling device, comprising:

a conduit having a first portion, a second portion, and an orifice portion, the orifice portion positioned at a location along the conduit between the first and second portions, a maximum cross-sectional area of the orifice portion being smaller than a maximum cross-sectional area of the first portion and the second portion;

a pressure sensor arrangement configured to measure pressure within the conduit; and a movable element extending into the conduit and movable relative to the orifice portion of the conduit in a direction transverse to a longitudinal dimension of the conduit to control fluid flow through the conduit, wherein the movable element includes a width measure in a first direction, the first direction being transverse to the longitudinal dimension of the conduit and transverse to a direction of movement of the movable element, wherein a maximum width of the movable element is less than a minimum width of the conduit measured in the first direction.

* * * * *

UNITED STATES PATENT AND TRADEMARK OFFICE
CERTIFICATE OF CORRECTION

| | |
|---|---|
| PATENT NO. | : 7,422,028 B2 |
| APPLICATION NO. | : 11/592488 |
| DATED | : September 9, 2008 |
| INVENTOR(S) | : Nugent et al. |

It is certified that error appears in the above-identified patent and that said Letters Patent is hereby corrected as shown below:

Title page, insert the omitted Related U.S. Application Data as follows:

--Related U.S. Application Data--

Item --(63) Continuation of application No. 10/728,594, filed on Dec. 3, 2003, now Pat. No. 7,131,451.--

Item --(60) Provisional application No. 60/500,774, filed on Sep. 4, 2003.--

Signed and Sealed this

Tenth Day of March, 2009

JOHN DOLL
*Acting Director of the United States Patent and Trademark Office*